(12) United States Patent
Chen et al.

(10) Patent No.: US 9,706,104 B2
(45) Date of Patent: Jul. 11, 2017

(54) IMAGE AUTO-FOCUSING METHOD AND CAMERA USING SAME

(71) Applicant: ZHEJIANG UNIVIEW TECHNOLOGIES CO., LTD, Hangzhou (CN)

(72) Inventors: Fang Chen, Hangzhou (CN); Qingyi Chen, Hangzhou (CN)

(73) Assignee: ZHEJIANG UNIVIEW TECHNOLOGIES CO., LTD, Zhejiang (CN)

( * ) Notice: Subject to any disclaimer, the term of this patent is extended or adjusted under 35 U.S.C. 154(b) by 0 days.

(21) Appl. No.: 14/905,276

(22) PCT Filed: Jul. 23, 2014

(86) PCT No.: PCT/CN2014/082836
§ 371 (c)(1),
(2) Date: Jan. 14, 2016

(87) PCT Pub. No.: WO2015/010623
PCT Pub. Date: Jan. 29, 2015

(65) Prior Publication Data
US 2016/0165124 A1    Jun. 9, 2016

(30) Foreign Application Priority Data
Jul. 24, 2013    (CN) .......................... 2013 1 0318378

(51) Int. Cl.
*H04N 5/232*    (2006.01)
*G03B 13/00*    (2006.01)
(Continued)

(52) U.S. Cl.
CPC ......... *H04N 5/23212* (2013.01); *G03B 13/36* (2013.01); *H04N 5/2351* (2013.01); *H04N 7/183* (2013.01)

(58) Field of Classification Search
CPC ........... H04N 5/23212; H04N 5/23219; H04N 5/23293; H04N 2101/00; G03B 13/36; G02B 7/102; G02B 7/28; G02B 7/36
(Continued)

(56) References Cited

U.S. PATENT DOCUMENTS

| 8,730,380 B2 * | 5/2014 | Uchida | ................. G03B 13/36 |
| | | | 348/345 |
| 2001/0028402 A1 * | 10/2001 | Sugimoto | .......... H04N 5/23212 |
| | | | 348/345 |

(Continued)

FOREIGN PATENT DOCUMENTS

| CN | 1119768 A | 4/1996 |
| CN | 101840055 A | 9/2010 |

(Continued)

OTHER PUBLICATIONS

ISA Chinese Patent Office, International Search Report of PCT/CN2014/082836, Oct. 27, 2014, 4 pages.

*Primary Examiner* — Kelly L Jerabek
(74) *Attorney, Agent, or Firm* — McCoy Russell LLP (57) ABSTRACT

The present disclosure provides a method for calculating a focusing evaluation value. The method may be applied in a scene having a dynamic light source and include: dividing an image region of a camera into a plurality of sub-regions; selecting a first sub-region which is affected by a dynamic light source from the plurality of sub-regions; correcting a focusing evaluation value of the first sub-region with the focusing evaluation value of each of sub-regions adjacent to the first sub-region; and calculating a focusing evaluation value of the whole image region based on the focusing evaluation value of each of the sub-regions. The present disclosure improves the performance of auto-focusing in a scene having a dynamic light source.

12 Claims, 5 Drawing Sheets

(51) Int. Cl.
*G03B 13/36* (2006.01)
*H04N 5/235* (2006.01)
*H04N 7/18* (2006.01)

(58) Field of Classification Search
USPC .................................................. 348/345–352
See application file for complete search history.

(56) References Cited

U.S. PATENT DOCUMENTS

| | | | | |
|---|---|---|---|---|
| 2008/0316352 | A1* | 12/2008 | Cheng | G02B 7/28 348/345 |
| 2012/0050604 | A1* | 3/2012 | Hamada | G02B 7/36 348/349 |
| 2012/0162494 | A1* | 6/2012 | Nakamura | H04N 5/23212 348/345 |
| 2013/0016245 | A1 | 1/2013 | Yuba | |
| 2013/0107107 | A1* | 5/2013 | Ohbuchi | H04N 5/23212 348/349 |
| 2013/0201386 | A1* | 8/2013 | Ohbuchi | H04N 5/23212 348/349 |
| 2014/0198244 | A1* | 7/2014 | Hamada | G03B 13/18 348/346 |

FOREIGN PATENT DOCUMENTS

| | | |
|---|---|---|
| CN | 102478699 A | 5/2012 |
| CN | 103095983 A | 5/2013 |
| CN | 103200361 A | 7/2013 |
| CN | 103354599 A | 10/2013 |
| JP | 2010122301 A | 6/2010 |

* cited by examiner

Fig. 1

PRIOR ART

| (1, 1) | (1, 2) | (1, 3) | (1, 4) | (1, 5) | (1, 6) | (1, 7) | (1, 8) |
| --- | --- | --- | --- | --- | --- | --- | --- |
| (2, 1) | (2, 2) | (2, 3) | (2, 4) | (2, 5) | (2, 6) | (2, 7) | (2, 8) |
| (3, 1) | (3, 2) | (3, 3) | (3, 4) | (3, 5) | (3, 6) | (3, 7) | (3, 8) |
| (4, 1) | (4, 2) | (4, 3) | (4, 4) | (4, 5) | (4, 6) | (4, 7) | (4, 8) |
| (5, 1) | (5, 2) | (5, 3) | (5, 4) | (5, 5) | (5, 6) | (5, 7) | (5, 8) |

IMAGE AUTO-FOCUSING METHOD AND CAMERA USING SAME

CROSS-REFERENCE TO RELATED APPLICATIONS

The present application is a U.S. National Phase of International Patent Application No. PCT/CN2014/082836, entitled "IMAGE AUTO-FOCUSING METHOD AND CAMERA USING SAME," filed on Jul. 23, 2014, which claims priority to Chinese Patent Application No. 201310318378.1, entitled "IMAGE AUTO-FOCUSING METHOD AND CAMERA USING SAME," filed on Jul. 24, 2013, the entire contents of which are hereby incorporated by reference for all purposes.

BACKGROUND

The present disclosure relates to a camera such as surveillance camera, particularly relates to a method for calculating auto-focusing evaluation value with respect to a camera in a scene having a dynamic light source.

Auto-focusing is important for a camera to capture clear image. The performance of auto-focusing depends on accuracy and effectiveness of focusing evaluation function. A good focusing evaluation function is crucial to achieve auto-focusing in an integrated camera and may have characteristics such as good unbiasedness, single peak and anti-noise. Image blurring is usually due to loss of high frequency component, and thus a focusing evaluation function may be designed in such a way that a focused image contains more information and details than an out-of-focus image.

Figure 1:
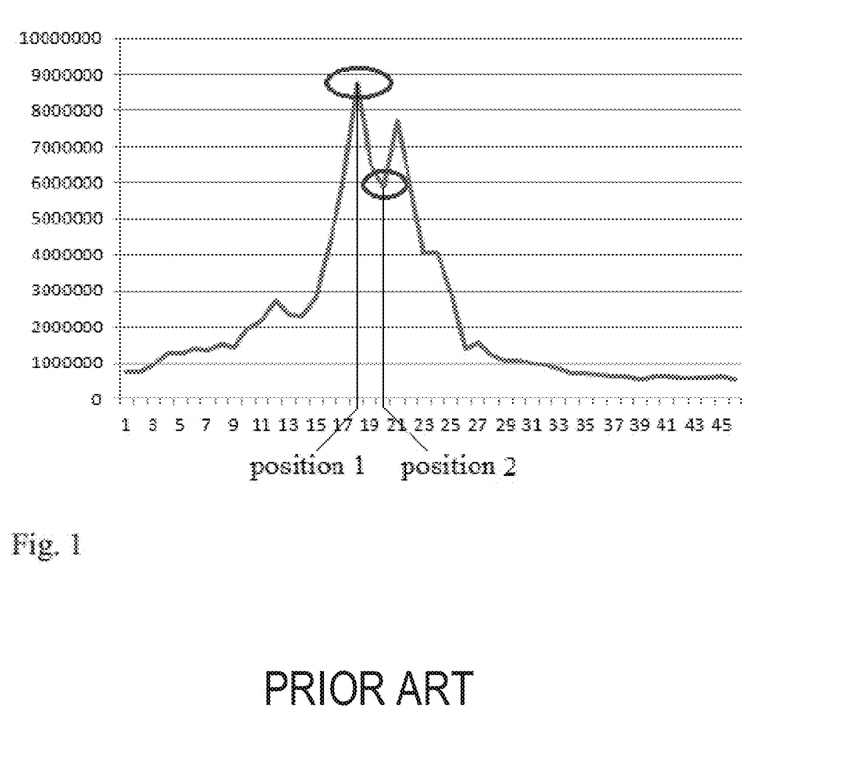
FIG. 1 illustrates an image definition evaluation curve under a scene having a dynamic light source.

A focusing evaluation curve (may also be referred as "image definition evaluation curve") under a night scene having a dynamic light source is illustrated in FIG. 1. The horizontal coordinate represents a relative value of a focus position, and the vertical coordinate represents a focusing evaluation value (may also be referred as "image definition evaluation value") calculated according to a focusing evaluation function. There are two peaks on the curve, and position 1 corresponding to the peak of highest image definition evaluation value may be finally selected as focus position. However, an image actually obtained at position 2 may have a higher definition than an image actually obtained at position 1. It may indicate that the focusing evaluation function loses effectiveness. For example, if a dynamic light source in the scene switches from on to off during the auto-focusing, the brightness in some region corresponding to position 2 may be lower than the brightness in some region corresponding to position 1, it may cause the focusing evaluation value corresponding to position 2 to be lower than the focusing evaluation value corresponding to position 1, and thus have negative effect on the accuracy and effectiveness of the auto-focusing evaluation function.

DETAILED DESCRIPTION OF THE EMBODIMENTS

In order to address above mentioned problem, according to one aspect of the present disclosure, an auto-focusing method is provided to obtain an auto-focusing evaluation curve having single peak, and thus the influence from a dynamic light source on the auto-focusing evaluation function may be decreased as much as possible.

Figure 2:
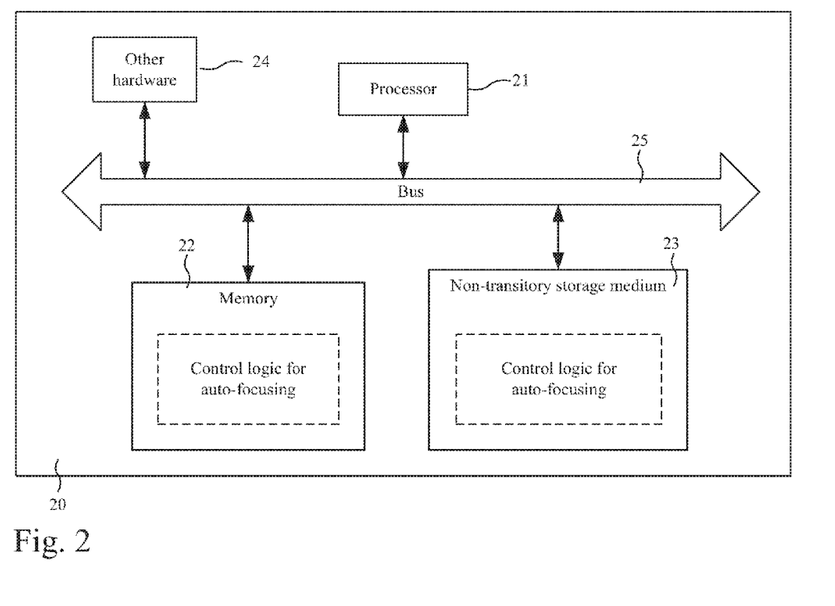
FIG. 2 illustrates a hardware structure of a camera according to an example of the present disclosure.
Figure 3:
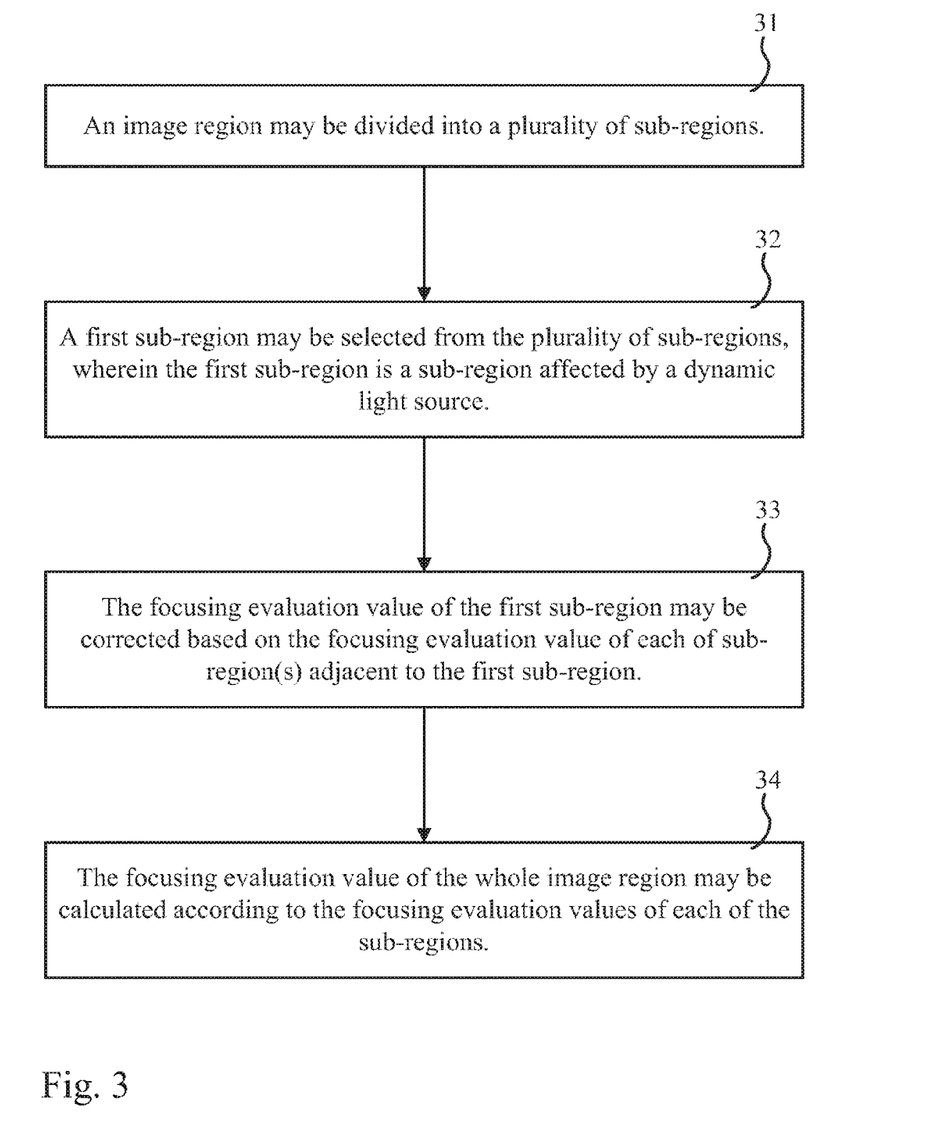
FIG. 3 illustrates a flowchart of auto-focusing method according to an example of the present disclosure.

FIG. 2 illustrates a camera according to an example of the present disclosure, and FIG. 3 illustrates an auto-focusing method according to an example of the present disclosure. As shown in FIG. 2, camera 20 may include a processor 21, a memory 22, a non-transitory storage medium 23 and other hardware 24 such as a sensor, which may be connected with each other through an internal bus 25. Wherein, the processor 21 may read machine executable instructions corresponding to control logic for auto-focusing stored in the non-transitory storage medium 23 into the memory 22, and then execute the machine executable instructions to carry out the method illustrated in FIG. 3. As shown in FIG. 3, the method may include blocks 31-34.

At block 31, an image region may be divided into a plurality of sub-regions.

At block 32, a first sub-region may be selected from the plurality of sub-regions. Wherein, the first sub-region is a sub-region affected by a dynamic light source.

At block 33, the focusing evaluation value of the first sub-region may be corrected based on the focusing evaluation value of each of sub-region(s) adjacent to the first sub-region.

At block 34, the focusing evaluation value of the whole image region may be calculated according to the focusing evaluation values of each of the sub-regions.

Figure 4:
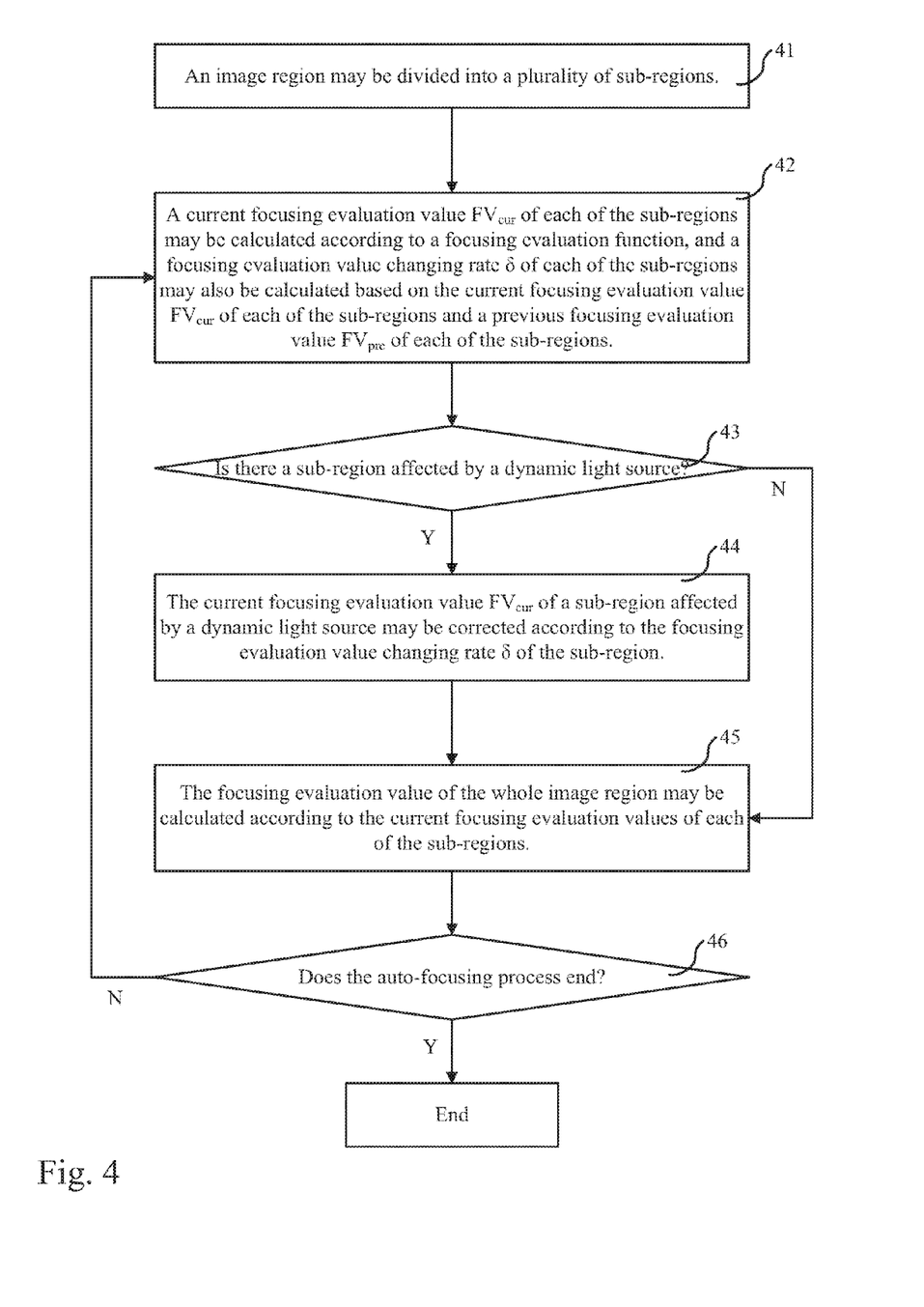
FIG. 4 illustrates a flowchart of auto-focusing method according to another example of the present disclosure.

FIG. 4 illustrates a flowchart of an auto-focusing method according to another example of the present disclosure. The method may be applied in a scene having a dynamic light source. As shown in FIG. 4, the method may include blocks 41-46.

At block 41, an image region may be divided into a plurality of sub-regions.

At block 42, a focusing evaluation value $FV_{cur}$ of each of the sub-regions in current frame image (may also be referred to as "current focusing evaluation value $FV_{cur}$ of a sub-region") may be calculated according to a focusing evaluation function, and a focusing evaluation value changing rate $\delta$ of each of the sub-regions may also be calculated based on the current focusing evaluation value $FV_{cur}$ of each of the sub-regions and a focusing evaluation value $FV_{pre}$ of each of the sub-regions in previous frame image (may also be referred to as "previous focusing evaluation value $FV_{pre}$ of a sub-region").

Wherein, the focusing evaluation function may be selected from some existing functions, such as Laplace function, Brenner function, Tenengrad function, Robert function and gradient square function. The focusing evaluation value changing rate $\delta$ of a sub-region may be calculated with the following equation:

$$\delta = \frac{FV_{cur} - FV_{pre}}{FV_{pre}}$$

Wherein, δ represents the focusing evaluation value changing rate of a sub-region;

$FV_{cur}$ represents the current focusing evaluation value of the sub-region, i.e., the focusing evaluation value of the sub-region in current frame image; and $FV_{pre}$ represents the previous focusing evaluation value of the sub-region, i.e., the focusing evaluation value of the sub-region in a previous frame image.

It can be seen from above that, the focusing evaluation value changing rate δ of a sub-region may indicate changing rate of the current focusing evaluation value $FV_{cur}$ of the sub-region with respect to the previous focusing evaluation value $FV_{pre}$ of the sub-region and can be used to determine whether the sub-region is affected by a dynamic light source or not.

At block 43, according to the focusing evaluation value changing rate δ of each of the sub-regions, it may determine whether there is a sub-region affected by a dynamic light source or not. If the determination result is Yes, the process may proceed to block 44; and otherwise, the process may proceed to block 45.

For determining whether a sub-region is affected by a dynamic light source or not, it may use any one of the following methods introduced by way of example but not limit.

Method 1: if the absolute value of the focusing evaluation value changing rate δ of a sub-region is larger than a preset first threshold, it may determine that the sub-region is affected by a dynamic light source, for example, there is a dynamic light source in the sub-region.

Method 2: if the absolute value of the focusing evaluation value changing rate δ of a sub-region is larger than a preset second threshold and the focusing evaluation value changing trend in the sub-region is adverse to that of sub-region(s) adjacent to the sub-region, it may determine that the sub-region is affected by a dynamic light source.

Wherein, the first threshold and the second threshold may be set by user according to her/his experience. For example, the first threshold may usually be set as larger than the second threshold.

If it determines that there is a sub-region affected by a dynamic light source, it may be necessary to correct the current focusing evaluation value $FV_{cur}$ of the sub-region calculated in block 42; otherwise, the current focusing evaluation value $FV_{cur}$ of the sub-region calculated in block 42 would remain as it is.

At block 44, the current focusing evaluation value $FV_{cur}$ of a sub-region affected by a dynamic light source may be corrected according to the focusing evaluation value changing rate δ of the sub-region.

For example, the current focusing evaluation value $FV_{cur}$ of a sub-region affected by a dynamic light source may be corrected with the following equation:

$$FV_{cur}' = FV_{pre}(1+\delta')$$

Wherein, $FV_{cur}'$ represents a corrected current focusing evaluation value of the sub-region;

$FV_{pre}$ represents the previous focusing evaluation value of the sub-region; and δ' represents a correction factor of the sub-region, and it may be calculated as an average value of the focusing evaluation value changing rates of the sub-region and its adjacent sub-region(s).

By correcting the current focusing evaluation value of a sub-region affected by a dynamic light source based on the focusing evaluation value changing rates of the sub-region and its adjacent sub-region(s), the influence from a dynamic light source on the calculation of focusing evaluation value may be decreased as much as possible, and thus the influence from the dynamic light source on the focusing evaluation function may be eliminated as much as possible.

Further, if there are two or more adjacent sub-regions affected by a dynamic light source, corrections to respective focusing evaluation values of these sub-regions may affect each other. In this case, corrections to respective focusing evaluation values of these sub-regions may be performed in a descending order of the absolute value of the focusing evaluation value changing rates of these sub-regions, so as to avoid or prevent a sub-region whose focusing evaluation value changing rate is relatively low from being affected by a sub-region whose focusing evaluation value changing rate is relatively high. For example, two or more sub-regions having dynamic light source may be sorted by the focusing evaluation value changing rates of these sub-regions; and then, the sub-region with the highest focusing evaluation value changing rate may be corrected at first, the sub-region with the second-high focusing evaluation value changing rate may be corrected subsequently, and the sub-region with the lowest focusing evaluation value changing rate may be corrected at last.

At block 45, the focusing evaluation value of the whole image region may be calculated according to the current focusing evaluation values of each of the sub-regions.

At block 46, it may determine whether the focusing process ends. And if it determines that the focusing process ends, the process may end; otherwise, the process may return to block 42.

If the current focusing evaluation value of a sub-region is corrected, the corrected current focusing evaluation value may be used as the current focusing evaluation value of the sub-region to calculate the focusing evaluation value of the whole image region. As to how to calculate the focusing evaluation value of the whole image region according to the focusing evaluation value of each of the sub-regions and how to determine whether the focusing process ends, any one of existing methods in the related art may be used and thus the detailed description thereof is omitted here.

An example of the present disclosure will be described with reference to FIG. 5.

Figure 5:
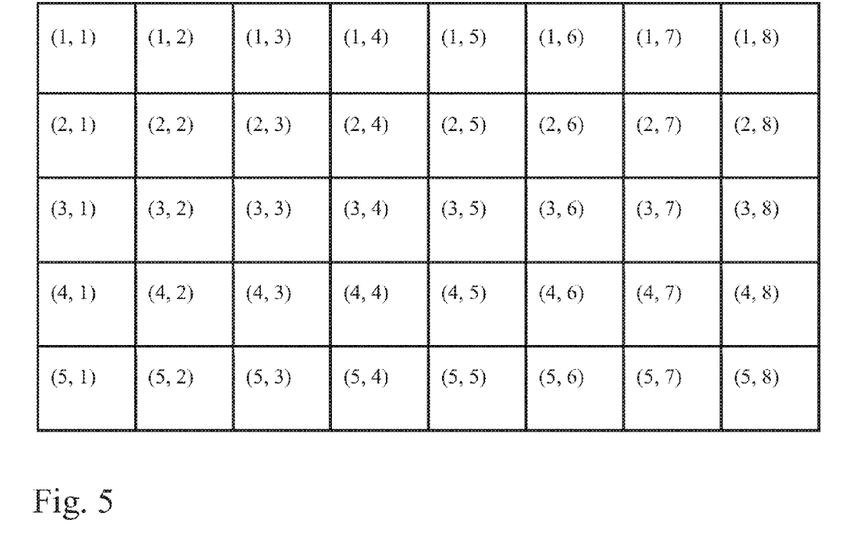
FIG. 5 is a diagram illustrating dividing sub-regions in an image according to an example of the present disclosure.

First, as shown in FIG. 5, an image region is divided into 5*8 sub-regions. Each of the sub-regions may be identified as sub-region (i, j), wherein i represents an index number of the row at which the sub-region locates and j represents an index number of the column at which the sub-region locates. For example, the sub-region locating at the first row and the first column may be identified as sub-region (1, 1), the sub-region at the first row and the second column is represented as (1, 2), and so on.

The current focusing evaluation value of sub-region (i, j) may be calculated according to a focusing evaluation function, and then the focusing evaluation value changing rate of the sub-region may be calculated as described above. Taking sub-region (3, 5) as an example, if its current focusing evaluation value $FV_{(3,5)cur}$ is calculated according to the focusing evaluation function as 60, its previous focusing evaluation value $FV_{(3,5)pre}$ is 10, its focusing evaluation value changing rate $\delta_{35}$ may be calculated as 5 (=(60−10)/10). In this way, with respect to the image region divided into 40 sub-regions as shown in FIG. 5, there are 40 focusing evaluation values and 40 focusing evaluation value changing rates will be generated for each of frame images captured in the image region.

After obtaining the focusing evaluation value changing rate of each of the sub-regions, it may determine whether there is a sub-region affected by a dynamic light source according to a predetermined rule. For example, it may determine whether the absolute value of the focusing evaluation value changing rate of a sub-region is larger than 3, and if the determination result is Yes, it may indicate that the sub-region is affected by a dynamic light source. In this way, according to the focusing evaluation value changing rate $\delta_{35}$ of 5, it may determine that sub-region (3, 5) is affected by a dynamic light source. For any one of other sub-regions, it may determine whether it is affected by a dynamic light source or not with the same way.

Further, for the image region divided into a plurality of sub-regions as shown in FIG. 5, if it determines that only sub-region (3, 5) is affected by a dynamic light source and other sub-regions are not affected by a dynamic light source, it may be necessary to correct the current focusing evaluation value of sub-region (3, 5).

According to an example of the present disclosure, the current focusing evaluation value of sub-region (3, 5) may be corrected as follows:

Firstly, a correction factor $\delta_{35}'$ of sub-region (3, 5) may be calculated. For example, if the adjacent sub-regions of sub-region (3, 5) include sub-regions (3, 4), (3, 6), (2, 5) and (4, 5), and the focusing evaluation value changing rates $\delta_{35}$, $\delta_{34}$, $\delta_{36}$, $\delta_{25}$ and $\delta_{45}$ of sub-regions (3, 5), (3, 4), (3, 6), (2, 5) and (4, 5) are 5, 1, 1, 1, and 2 respectively, the correction factor of $\delta_{35}'$ of sub-region (3, 5) may be calculated as 2 (=(5+1+1+1+2)/5).

Then, the current focusing evaluation value of sub-region (3, 5) may be corrected according to the correction factor of $\delta_{35}'$ of sub-region (3, 5). For example, the current focusing evaluation value of sub-region (3, 5) may be calculated as 30 (=10*(1+2)).

And thus, the current focusing evaluation value of sub-region (3, 5) may be corrected from original 60 to 30.

In another example, if it determines that there are two sub-regions (3, 5) and (5, 2) affected by a dynamic light source, the current focusing evaluation value of sub-region (3, 5) may be corrected as described above, and the current focusing evaluation value of sub-region (5, 2) may also be corrected in a similar way. Wherein, the adjacent sub-regions of sub-region (5, 2) may include sub-regions (5, 1), (5, 3) and (4, 2).

In still another example, if it determines that there are two adjacent sub-regions (3, 5) and (3, 6) affected by a dynamic light source, the current focusing evaluation values of these two adjacent sub-regions may be sequentially corrected in a descending order of the absolute value of focusing evaluation value changing rates. This is because, as described above, different order of corrections to sub-region (3, 5) and (3, 6) may cause different results. For example, if the current focusing evaluation value of sub-region (3, 5) is 60 and the current focusing evaluation value of sub-region (3, 6) is 100, it may be reasonable that, after the corrections to sub-region (3, 5) and (3, 6) are completed, the corrected current focusing evaluation value of sub-region (3, 6) is still larger than corrected current focusing evaluation value of sub-region (3, 5). So, if the focusing evaluation value changing rate $\delta_{35}$ of sub-region (3, 5) is lower than the focusing evaluation value changing rate $\delta_{36}$ of sub-region (3, 6) (for example, $\delta_{35}$ is 5 and $\delta_{36}$ is 8), the focusing evaluation value of sub-region (3, 6) may be corrected earlier than the focusing evaluation value of sub-region (3, 5), so as to prevent sub-region (3, 5) from being affected by sub-region (3, 6).

Figure 6:
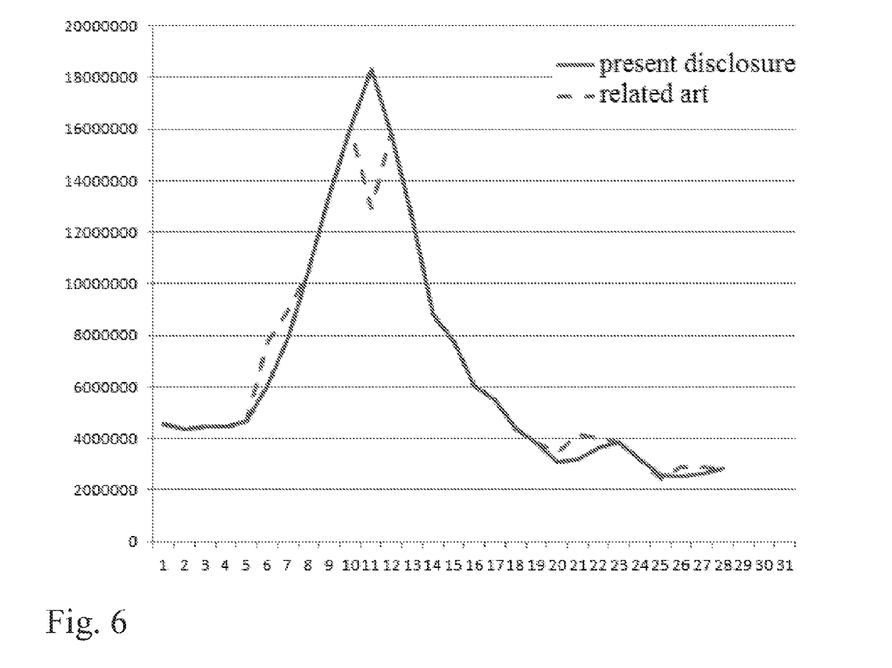
FIG. 6 illustrates a comparison of an image definition evaluation curve obtained by a method according to the present disclosure and an image definition evaluation curve obtained by a method according to the related art.

FIG. 6 illustrates a focusing evaluation curve acquired by the method of the present disclosure under a night scene. By comparing with the focusing evaluation curve shown in FIG. 1 which is acquired by a method in related art under the same night scene, it can be found that the focusing evaluation curve acquired according to the present disclosure has single peak and shows significantly better effectiveness than the focusing evaluation curve acquired according to the related art.

The foregoing disclosure is merely illustrative of example embodiments of the disclosure but is not intended to limit the disclosure, and any modifications, equivalent substitutions, adaptations, thereof made without departing from the spirit and scope of the disclosure shall be encompassed in the claimed scope of the appended claims.

The invention claimed is:

1. A method for calculating a focusing evaluation value under a scene having a dynamic light source, comprising:
   dividing an image region into a plurality of sub-regions;
   selecting a first sub-region from the plurality of sub-regions, wherein, the first sub-region is a sub-region affected by the dynamic light source;
   calculating a target focusing evaluation value of the first sub-region with the following equation:

$FV_{cur}'=FV_{pre}(1+\delta')$, wherein $FV_{cur}'$ represents the target focusing evaluation value of the first sub-region,
   wherein $FV_{pre}$ represents a focusing evaluation value of the first sub-region in a previous frame image, and
   wherein $\delta'$ represents a correction factor of the first sub-region and is calculated as an average value of focusing evaluation value changing rates of the first sub-region and its adjacent sub-region,
   wherein a focusing evaluation value changing rate of a sub-region is calculated by dividing a difference between a focusing evaluation value of the sub-region in a current frame image and a focusing evaluation value of the sub-region in a previous frame image by the focusing evaluation value of the sub-region in the previous frame image;
   correcting the focusing evaluation value of the first sub-region in the current frame image to the calculated target focusing evaluation value of the first sub-region; and
   calculating a focusing evaluation value of the image region based on the focusing evaluation value of each of the sub-regions after the correction.

2. The method of claim 1, wherein, selecting the first sub-region from the plurality of sub-regions includes:
   for each of the sub-regions, determining whether the sub-region is affected by the dynamic light source according to the focusing evaluation value changing rate of the sub-region.

3. The method of claim 2, wherein, determining whether the sub-region is affected by the dynamic light source according to the focusing evaluation value changing rate of the sub-region includes:
   if an absolute value of the focusing evaluation value changing rate of the sub-region is larger than a preset first threshold, determining that the sub-region is affected by the dynamic light source; or
   if the absolute value of the focusing evaluation value changing rate of the sub-region is larger than a preset second threshold and a focusing evaluation value changing trend of the sub-region is adverse to that of its adjacent sub-regions, determining that the sub-region is affected by the dynamic light source.

4. The method of claim 1, wherein, if there are two or more first sub-regions, the correction to each of the first sub-regions is sequentially performed in a descending order of an absolute value of the focusing evaluation value changing rates of the first sub-regions.

5. A camera, comprising:
a processor; and
a non-transitory storage medium,
wherein the non-transitory storage medium is stored with machine executable instructions corresponding to control logic for auto-focusing, wherein, by executing the instructions, the processor is caused to:
divide an image region of the camera into a plurality of sub-regions;
select a first sub-region from the plurality of sub-regions, wherein, the first sub-region is a sub-region affected by a dynamic light source;
calculate a target focusing evaluation value of the first sub-region with the following equation:

$$FV_{cur}'=FV_{pre}(1+\delta'),$$

wherein $FV_{cur}'$ represents the target focusing evaluation value of the first sub-region,
wherein $FV_{pre}$ represents a focusing evaluation value of the first sub-region in a previous frame image, and
wherein $\delta'$ represents a correction factor of the first sub-region and is calculated as an average value of focusing evaluation value changing rates of the first sub-region and its adjacent sub-region,
wherein a focusing evaluation value changing rate of a sub-region is calculated by dividing a difference between a focusing evaluation value of the sub-region in a current frame image and a focusing evaluation value of the sub-region in a previous frame image by the focusing evaluation value of the sub-region in the previous frame image;
correct the focusing evaluation value of the first sub-region in the current image to the calculated target focusing evaluation value of the first sub-region; and
calculate a focusing evaluation value of the image region based on the focusing evaluation value of each of the sub-regions after the correction.

6. The camera of claim 5, wherein, for selecting the first sub-region from the plurality of sub-regions, the instructions further cause the processor to:
for each of the sub-regions, determine whether the sub-region is affected by the dynamic light source according to the focusing evaluation value changing rate of the sub-region.

7. The camera of claim 6, wherein, for determining whether the sub-region is affected by the dynamic light source according to the focusing evaluation value changing rate of the sub-region, the instructions further cause the processor to:
if an absolute value of the focusing evaluation value changing rate of the sub-region is larger than a preset first threshold, determine that the sub-region is affected by the dynamic light source; or
if the absolute value of the focusing evaluation value changing rate of the sub-region is larger than a preset second threshold and a focusing evaluation value changing trend of the sub-region is adverse to that of its adjacent sub-regions, determine that the sub-region is affected by the dynamic light source.

8. The camera of claim 5, wherein, if there are two or more first sub-regions, the instructions further cause the processor to:
perform the correction to each of the first sub-regions sequentially in a descending order of an absolute value of the focusing evaluation value changing rates of the first sub-regions.

9. A device comprising:
a processor,
wherein by executing machine executable instructions which are stored in a non-transitory storage medium and correspond to control logic for auto-focusing, the processor is caused to:
divide an image region into a plurality of sub-regions;
select a first sub-region from the plurality of sub-regions, wherein, the first sub-region is a sub-region affected by a dynamic light source;
calculate a target focusing evaluation value of the first sub-region with the following equation:

$$FV_{cur}'=FV_{pre}(1+\delta'),$$

wherein $FV_{cur}'$ represents the target focusing evaluation value of the first sub-region,
wherein $FV_{pre}$ resents a focusing evaluation value of the first sub-region in a previous frame image, and
wherein $\delta'$ represents a correction factor of the first sub-region and is calculated as an average value of focusing evaluation value changing rates of the first sub-region and its adjacent sub-region,
wherein a focusing evaluation value changing rate of a sub-region is calculated by dividing a difference between a focusing evaluation value of the sub-region in a current frame image and a focusing evaluation value of the sub-region in a previous frame image by the focusing evaluation value of the sub-region in the previous frame image;
correct the focusing evaluation value of the first sub-region in the current frame image to the calculated target focusing evaluation value of the first sub-region; and
calculate a focusing evaluation value of the image region based on the focusing evaluation value of each of the sub-regions after the correction.

10. The device of claim 9, wherein, for selecting the first sub-region from the plurality of sub-regions, the instructions further cause the processor to:
for each of the sub-regions, determine whether the sub-region is affected by the dynamic light source according to the focusing evaluation value changing rate of the sub-region.

11. The device of claim 10, wherein, for determining whether the sub-region is affected by the dynamic light source according to the focusing evaluation value changing rate of the sub-region, the instructions further cause the processor to:
if an absolute value of the focusing evaluation value changing rate of the sub-region is larger than a preset first threshold, determine that the sub-region is affected by the dynamic light source; or
if the absolute value of the focusing evaluation value changing rate of the sub-region is larger than a preset second threshold and a focusing evaluation value changing trend of the sub-region is adverse to that of its adjacent sub-regions, determine that the sub-region is affected by the dynamic light source.

12. The device of claim 9, wherein, if there are two or more first sub-regions, the instructions further cause the processor to:
    perform the correction to each of the first sub-regions sequentially in a descending order of an absolute value of the focusing evaluation value changing rates of the first sub-regions.

\* \* \* \* \*